United States Patent
Jakubowski et al.

[11] Patent Number: 5,959,027
[45] Date of Patent: Sep. 28, 1999

[54] CONTINUOUS PROCESS FOR PREPARING A POLYURETHANE LATEX

[75] Inventors: James J. Jakubowski, Midland, Mich.; Wayne R. Willkomm, Lake Jackson, Tex.; James E. Pate, III, Sanford, Mich.

[73] Assignee: The Dow Chemical Company, Midland, Mich.

[21] Appl. No.: 09/040,027

[22] Filed: Mar. 17, 1998

Related U.S. Application Data

[60] Provisional application No. 60/039,194, Mar. 17, 1997.

[51] Int. Cl.[6] .................................. C08J 3/00; C08J 3/02; C08K 3/20; C08L 75/00
[52] U.S. Cl. ..................... 524/839; 523/335; 524/591; 524/840
[58] Field of Search ...................... 524/591, 839, 524/840; 523/335

[56] References Cited

U.S. PATENT DOCUMENTS

| | | | |
|---|---|---|---|
| 3,178,310 | 4/1965 | Berger et al. | 117/142 |
| 3,294,724 | 12/1966 | Axelrood et al. | 260/29.2 |
| 3,410,817 | 11/1968 | McClellan, Jr. et al. | 260/29.2 |
| 3,919,173 | 11/1975 | Coyner et al. | 260/77.5 AT |
| 4,269,748 | 5/1981 | Nachtkamp et al. | 260/29.2 TN |
| 4,442,259 | 4/1984 | Isgur et al. | 524/839 |
| 4,444,976 | 4/1984 | Rabito | 528/60 |
| 4,742,095 | 5/1988 | Markusch et al. | 523/322 |
| 4,879,322 | 11/1989 | Markusch et al. | 523/322 |
| 4,921,842 | 5/1990 | Henning et al. | 524/839 |
| 5,041,467 | 8/1991 | Kataoka et al. | 521/99 |
| 5,043,381 | 8/1991 | Coogan et al. | 524/591 |
| 5,124,073 | 6/1992 | Goffing et al. | 252/314 |
| 5,169,895 | 12/1992 | Coogan et al. | 524/591 |
| 5,221,710 | 6/1993 | Markusch et al. | 524/591 |
| 5,389,720 | 2/1995 | Markusch et al. | 524/839 |
| 5,432,228 | 7/1995 | Hilken et al. | 524/591 |
| 5,527,853 | 6/1996 | Landy et al. | 524/521 |
| 5,539,021 | 7/1996 | Pate et al. | 523/335 |
| 5,576,382 | 11/1996 | Seneker et al. | 524/591 |
| 5,583,176 | 12/1996 | Haberle | 524/591 |
| 5,688,842 | 11/1997 | Pate, III et al. | 523/335 |

FOREIGN PATENT DOCUMENTS

| | | |
|---|---|---|
| 06 01 764 | 6/1994 | European Pat. Off. . |
| 0 794 203 A2 | 9/1997 | European Pat. Off. . |
| 1 432 112 | 4/1976 | Germany . |

OTHER PUBLICATIONS

Hansen, C. M., J. Paint Technol., vol. 39, No. 511, pp. 505–510 (Aug. 1967).

*Primary Examiner*—Patrick D. Niland

[57] ABSTRACT

A polyurethane/urea/thiourea latex having a narrow molecular weight polydispersity and sub-micron particle size can be prepared by first preparing a high internal phase ratio (HIPR) emulsion of a polyurethane/urea/thiourea prepolymer, then contacting the emulsion with a chain-extending reagent under such conditions to form the polymer latex.

21 Claims, 1 Drawing Sheet

CONTINUOUS PROCESS FOR PREPARING A POLYURETHANE LATEX

CROSS-REFERENCE TO RELATED APPLICATION

This application claims the benefit of U.S. Provisional Application No. 60/039,194, filed Mar. 17, 1997.

BACKGROUND OF THE INVENTION

This invention relates to polyurethane/urea/thiourea latexes prepared from a high internal phase ratio emulsion of a urethane/urea/thiourea prepolymer.

Polyurethane/urea/thiourea latexes are generally prepared by chain extending the reaction product of an organic diisocyanate and an organic compound having two active hydrogen atoms such as polyalkylene ether glycols, poly (alkylene ether-alkylene thioether) glycols, alkyd resins, polyesters and polyester amides. The diisocyanate is used in stoichiometric excess so that the reaction product, also referred to as a polyurethane/urea/thiourea prepolymer, is isocyanate terminated. The prepolymer is typically prepared in the presence of a solvent. Examples of polyurethane prepolymer preparations are described in U.S. Pat. Nos. 3,178,310, 3,919,173, 4,442,259, 4,4442,976, and 4,742,095, inter alia.

U.S. Pat. No. 3,294,724 discloses the preparation of a film-forming, urethane latex by chain extending the isocyanate-terminated prepolymer with a piperazine compound. First, the prepolymer is prepared by reacting a polyalkylene ether glycol with a diisocyanate. A prepolymer emulsion is then formed, whereupon a piperazine compound dissolved in cold water is added to the emulsion with stirring to form a stable chain-extended latex. A solvent such as toluene or cyclohexanone is used either in the step to form the prepolymer or in the chain extension step.

The solids content of a typical polyurethane latex tends to be in the range of about 30 to 40 weight percent. For example, U.S. Pat. No. 4,742,095 describes the preparation of a polyurethane latex having a solids content of as high as 41 weight percent. To minimize transport costs and drying times, it is desirable to prepare a polyurethane latex that maximizes solids content without having to resort to additional concentration means such as evaporation of water.

It would be advantageous to prepare a polyurethane/urea/thiourea latex in the substantial absence of any ancillary organic solvents. It would be further advantageous to prepare such a latex with controlled particle size and a narrow particle size distribution. Finally, it would be desirable to prepare a polyurethane latex that has a solids content of at least 45 percent by weight. Such a latex would be particularly useful as a carpet backing.

SUMMARY OF THE INVENTION

In one aspect, the present invention is a process for preparing a polyurethane/urea/thiourea latex comprising the steps of: a) forming by a continuous process a high internal phase ratio (HIPR) emulsion of a polyurethane/urea/thiourea prepolymer in the presence of water and an emulsifying and stabilizing amount of a surfactant; and b) contacting the high internal phase ratio emulsion with a chain-extending reagent under such conditions to form the polyurethane/urea/thiourea latex; wherein the prepolymer is prepared by contacting a high molecular weight organic compound having at least two active hydrogen atoms with sufficient polyisocyanate, and under such conditions to ensure that the prepolymer is terminated with at least two isocyanate groups.

In another aspect, the present invention is a process for preparing a polyurethane/urea/thiourea latex comprising the steps of: a) continuously merging, into a disperser and in the presence of an emulsifying and stabilizing amount of a surfactant, an aqueous stream having a flow rate $R_1$ and a polyurethane/urea/thiourea prepolymer stream having a flow rate $R_2$; b) mixing the merged streams with a sufficient amount of shear to form a high internal phase ratio emulsion; and c) mixing the high internal phase ratio emulsion with water and a chain-extending reagent to form a polyurethane/urea/thiourea latex; wherein $R_2:R_1$ is such that the polydispersity of the HIPR emulsion is not greater than about 3 or the volume average particle size is not greater than about 2 microns.

In another aspect, the present invention is a continuous process for preparing a polyurethane/urea/thiourea latex comprising the steps of: a) merging a stream containing a stoichiometric excess of a polyisocyanate with a stream containing a high molecular weight organic compound having at least two active hydrogen atoms into a static or an active mixer under such conditions to form a polyurethane prepolymer that is terminated with at least two end groups; b) forming an emulsion of the prepolymer by merging a stream containing the prepolymer with a stream containing water and in the presence of an emulsifying and stabilizing amount of a surfactant; and c) contacting a stream of the emulsion with a stream of a chain-extending reagent under such conditions to form a polyurethane/urea/thiourea latex.

In another aspect, the present invention is a polyurethane/urea/thiourea latex having a solids content of not less than 45 percent by weight, based on the total weight of the latex.

DETAILED DESCRIPTION OF THE INVENTION

Figure 1:
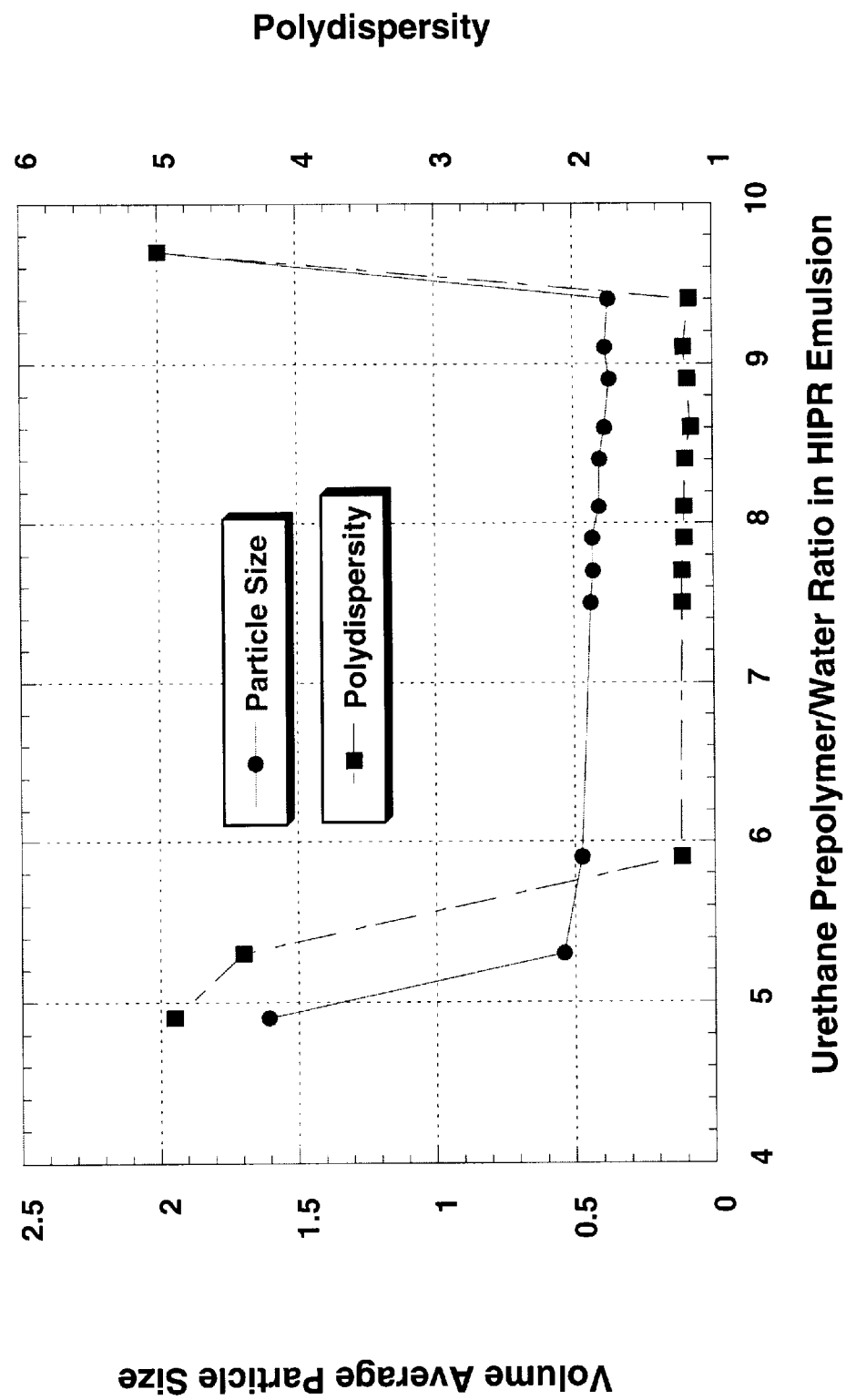
FIG. 1 is a profile of the particle size and polydispersity of an HIPR emulsion as a function of the urethane prepolymer to water flow rates used to prepare the emulsion. The emulsion is stabilized with linear sodium dodecylbenzene sulfonate.

The polyurethane/urea/thiourea latex of the present invention can be prepared by reacting a polyurethane/urea/thiourea prepolymer with a chain-extending reagent in an aqueous medium and in the presence of a stabilizing amount of a surfactant. The polyurethane/urea/thiourea prepolymer can be prepared by any suitable method such as those well known in the art. The prepolymer is advantageously prepared by contacting a high molecular weight organic compound having at least two active hydrogen atoms with sufficient polyisocyanate, and under such conditions to ensure that the prepolymer is terminated with at least two isocyanate groups.

The polyisocyanate is preferably an organic diisocyanate, and may be aromatic, aliphatic, or cycloaliphatic, or a combination thereof. Representative examples of diisocyanates suitable for the preparation of the prepolymer include those disclosed in U.S. Pat. No. 3,294,724, column 1, lines 55 to 72, and column 2, lines 1 to 9, incorporated herein by reference, as well as U.S. Pat. No. 3,410,817, column 2, lines 62 to 72, and column 3, lines 1 to 24, also incorporated herein by reference. Preferred diisocyanates include 4,4'-diisocyanatodiphenylmethane, 2,4'-diisocyanatodiphenylmethane, isophorone diisocyanate, p-phenylene diisocyanate, 2,6 toluene diisocyanate, polyphenyl polymethylene polyisocyanate, 1,3-bis (isocyanatomethyl)cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, 2,4'-diisocyanatodicyclohexylmethane, and 2,4-toluene diisocyanate, or combinations thereof. More preferred diisocyanates are 4,4'-diisocyanatodicyclohexylmethane, 4,4'-diisocyanatodiphenylmethane, 2,4'-diisocyanatodicyclohexylmethane, and 2,4'-diisocyanatodiphenylmethane. Most preferred is 4,4'-diisocyanatodiphenylmethane and 2,4'-diisocyanatodiphenylmethane.

As used herein, the term "active hydrogen group" refers to a group that reacts with an isocyanate group to form a urea group, a thiourea group, or a urethane group as illustrated by the general reaction:

where X is O, S, NH, or N, and R and R' are connecting groups which may be aliphatic, aromatic, or cycloaliphatic, or combinations thereof. The high molecular weight organic compound with at least two active hydrogen atoms has a molecular weight of not less than 500 Daltons.

The high molecular weight organic compound having at least two active hydrogen atoms may be a polyol, a polyamine, a polythiol, or a compound containing combinations of amines, thiols, and ethers. Preferably, the high molecular weight organic compound having at least two active hydrogen atoms is a diol, a diamine, a dithiol, an alcohol-amine, a thiol-amine, or an alcohol-thiol, and has a weight average molecular weight of not less than 500. Preferably, the high molecular weight organic compound having at least two active hydrogen atoms is a polyalkylene glycol ether or thioether or polyester polyol or polythiol having the general formula:

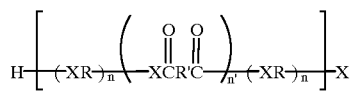

where each R is independently an alkylene radical; R' is an alkylene or an arylene radical; each X is independently S or O, preferably O; n is a positive integer; and n' is a non-negative integer, with the proviso that n and n' are sufficiently large that the compound has a weight average molecular weight of not less than about 500 Daltons, more preferably not less than about 750 Daltons, and most preferably not less than about 1000 Daltons. Preferably, the weight average molecular weight of the polyalkylene glycol is not greater than about 20,000 Daltons, more preferably not greater than about 10,000 Daltons, more preferably not greater than about 5000 Daltons, and most preferably not greater than about 3000 Daltons. The polyalkylene ether glycols and polyester polyols are preferred. Representative examples of polyalkylene ether glycols are polyethylene ether glycols, poly-1,2-propylene ether glycols, polytetramethylene ether glycols, poly-1,2-dimethylethylene ether glycols, poly-1,2-butylene ether glycol, and polydecamethylene ether glycols. Preferred polyester polyols include polybutylene adipate and polyethylene terephthalate.

A small amount of a low molecular compound with at least two active hydrogen atoms may be added along with to the high molecular weight organic compound having at least two active hydrogen atoms to increase the tensile strength of the resulting polymer. The molecular weight of the low molecular compound having at least two active hydrogen atoms is in the range of from about 62 Daltons to about 400 Daltons, and includes diols, dithiols, diamines, alcohol amines, alcohol thiols, and amine thiols. Diols including diethylene glycol, ethylene glycol, and dipropylene glycol are preferred. The amount of low molecular weight organic compound is preferably added in a sufficient amount to advantageously increase the tensile strength of the resulting polymer. More preferably, the amount of low molecular organic compound having at least two active hydrogen atoms is not less than 0.5 weight percent, most preferably not less than 1 weight percent based on the weight of the total compounds having active hydrogen atoms; and more preferably not greater than 10 weight percent, most preferably not greater than 5 weight percent based on the weight of the total compounds having active hydrogen atoms.

Preferably, the NCO:XH ratio, where X is O or S, preferably O, is not less than 1.1:1, more preferably not less than 1.2:1, and preferably not greater than 5:1.

The polyurethane prepolymer can be prepared by a batch or a continuous process by methods such as those well known in the art. For example, a stoichiometric excess of a diisocyanate and a polyol can be introduced in separate streams into a static or an active mixer, preferably in the presence of an activating amount of an organotin catalyst such as stannous octoate, and at a temperature suitable for controlled reaction of the reagents, typically from about 40° C. to about 100° C. The reaction is carried to substantial completion in a plug flow reactor to form the prepolymer. Upon substantial completion of the reaction, the temperature of the prepolymer may be adjusted for the formation of the HIPR emulsion.

The HIPR emulsion can be prepared by any suitable method such as those well known in the art. (See, for example, U.S. Pat. No. 5,539,021, column 1, lines 9 to 45, which teachings are incorporated herein by reference.) In the process of the present invention, the temperature at which the HIPR emulsion is prepared is not critical; however, it may be desirable in some instances to prepare the emulsion at subambient temperatures, because water slowly reacts with diisocyanate groups to form amines and $CO_2$, and it may be advantageous to suppress premature reaction of water and the prepolymer. Furthermore, the preferred temperature for preparing the HIPR emulsion is dependent on the residence time, that is, the time between the formation of the HIPR emulsion and the contact of the emulsion with the chain-extending reagent. In general, the shorter the residence time, the greater the flexibility in selection of temperature is.

In a preferred method of preparing the HIPR emulsion, a flowing stream containing the prepolymer is merged with a flowing stream containing water with sufficient shear to form the HIPR emulsion. An emulsifying and stabilizing amount of a surfactant is also present, either in the stream containing the prepolymer, in the stream containing the water, or in a separate stream. The relative rates of the stream containing the prepolymer ($R_2$) and the stream containing the water ($R_1$) are preferably such that the polydispersity of the HIPR emulsion (the ratio of the volume average diameter and the number average diameter of the particles or droplets, or $D_v/D_n$) is not greater than about 5, more preferably not greater than about 3, more preferably not greater than about 2, more preferably not greater than about 1.5, and most preferably not greater than about 1.3; or the volume average particle size is not greater than about 2 microns, more preferably not greater than about 1 micron, more preferably not greater than about 0.5 micron, and most preferably not greater than about 0.3 micron. Furthermore, it is preferred that the HIPR emulsion be prepared in a continuous process without phase inversion or stepwise distribution of an internal phase into an external phase.

The surfactant is sometimes used as a concentrate in water. In this case, a stream containing the surfactant is advantageously first merged with a stream containing the prepolymer to form a prepolymer/surfactant mixture. Although an HIPR emulsion can be prepared in this single step, it is preferred that a stream containing the prepolymer and the surfactant be merged with a water stream to dilute the surfactant and to create an HIPR emulsion.

Referring to FIG. 1, the profile of the polydispersity and volume average particle size of the HIPR emulsion prepolymer prepared with 1 percent RHODACAL™ LDS-22 surfactant (sodium dodecylbenzene sulfonate, a trademark of Rhone Poûlenc) is illustrated. The region where the oil:water feed rate ratio ($R_2:R_1$) is in the range of about 5:1 to about 9.2:1 represents the preferred operating range of $R_2:R_1$ for the given prepolymer (prepared by reacting 30 weight percent of a 50:50 mixture of 4,4'-diisocyanatodiphenylmethane and 2,4'-diisocyanatodiphenylmethane and 2,4'-diisocyanatodiphenylmethane with 70 weight percent of a polypropylene oxide diol having a weight average molecular weight of about 2000), and the type and amount of surfactant used.

When the HIPR emulsion is prepared using 3 percent by weight DeSULF™ TLS-40 surfactant (active ingredient is triethanolamine lauryl sulfate, a trademark of DeForest Enterprise, Inc.), the preferred $R_2:R_1$ is from about 5:1 to about 8:1. When the surfactant is 3 percent by weight DeSULF™ DBS-60T surfactant (active ingredient is triethanolamine dodecylbenzene sulfonate, a trademark of DeForest Enterprise, Inc.) the preferred $R_2:R_1$ is from about 3.5:1 to about 6:1.

An external surfactant, which may be cationic, anionic, or nonionic, is preferably used to prepare the HIPR emulsion. Suitable classes of surfactants include, but are not restricted to, sulfates of ethoxylated phenols such as poly(oxy-1,2-ethanediyl)($\alpha$-sulfo-$\omega$(nonylphenoxy) ammonium salt; alkali metal fatty acid salts such as alkali metal oleates and stearates; polyoxyalkylene nonionics such as polyethylene oxide, polypropylene oxide, polybutylene oxide, and copolymers thereof; alcohol alkoxylates; ethoxylated fatty acid esters and alkylphenol ethoxylates; alkali metal lauryl sulfates; amine lauryl sulfates such as triethanolamine lauryl sulfate; quaternary ammonium surfactants; alkali metal alkylbenzene sulfonates such as branched and linear sodium dodecylbenzene sulfonates; amine alkyl benzene sulfonates such as triethanolamine dodecylbenzene sulfonate; anionic and nonionic fluorocarbon surfactants such as fluorinated alkyl esters and alkali metal perfluoroalkyl sulfonates; organosilicon surfactants such as modified polydimethylsiloxanes; and alkali metal soaps of modified resins. If the prepolymer is self-emulsifying by inclusion of emulsifying nonionic, cationic, or anionic groups, then an external surfactant may or may not be necessary.

Generally, higher surfactant concentrations result in smaller diameter particles, but surfactant concentrations that are too high tend to deleteriously affect the properties of products such as films prepared from the HIPR emulsion. A person of ordinary skill in the art can readily determine the appropriate surfactant concentration for the particular end use.

Although it is possible to first dissolve the prepolymer in a solvent for the prepolymer prior to forming the HIPR emulsion, it is preferred to prepare the HIPR emulsion in the substantial absence of a solvent, more preferably in the absence of a solvent. As used herein, the term "in the substantial absence of a solvent" means that a solvent for the prepolymer represents not more than 10 weight percent, preferably not more than 5 weight percent, more preferably not more than 1 weight percent, and most preferably not more than 0.1 weight percent of the HIPR emulsion based on the weight of the prepolymer and the solvent.

The inclusion of a solvent often adds an unnecessary expense to the manufacture of the end-use product. Moreover, solvent removal, when necessary to obtain acceptable physical properties of the product, is also an expensive as well as a time-consuming step. Thus, a preferred process of the present invention represents an advance in the art of the preparation of urethane latexes.

A polyurethane/urea/thiourea polymer is prepared by contacting the HIPR emulsion of the prepolymer with a chain-extending reagent, which is a compound that contains functional groups that react with isocyanate groups to form urethane, urea, or thiourea groups. Chain-extending reagents are well known in the art.

The HIPR emulsion is preferably first diluted with sufficient water to form a prepolymer latex having a disperse phase to aqueous phase ratio that is less than about 3:1. Although water can be used as a chain-extending agent, other chain-extending, agents are preferred for building of molecular weight. Therefore, it is preferred that the prepolymer latex be contacted with the preferred chain-extending reagent before substantial reaction takes place between water and the prepolymer. Preferred chain-extending reagents include aliphatic, cycloaliphatic, aromatic polyamines, and alcohol amines. More preferred chain-extending reagents are alcohol monoamines such as monoethanol amine and diethanol amine, and diamines including hydrazine, ethylene diamine, propylene-1,2-diamine, propylene-1,3-diamine, tetramethylenediamine, hexamethylenediamine, 4,4'-dimethylamino-3,3'-dimethyl-diphenylmethane, 4,4'- diamino -diphenylmethane, 2,4-diaminotoluene, 2,6-diaminotoluene, aminoethylethanolamine, and piperazine. Water-soluble diamines are most preferred. Piperazine is an example of a most-preferred chain-extending agent.

The chain-extending reagent is preferably the limiting reagent because it is desirable to avoid residual chain-extending reagent, particularly diamine, in the final latex. Thus, in a preferred method of preparing the polyurethane/urea/thiourea latex, an aqueous solution of a diamine is contacted with a stoichiometric excess of a latex of the prepolymer (that is, a stoichiometric excess of isocyanate groups). After the diamine is substantially completely reacted, the resultant latex is preferably allowed to stand for a sufficiently long time so that the remaining isocyanate groups react with the water. The preferred latex is a polyurethane/urea latex having a volume average particle size of not greater than about 1 micron, more preferably not greater than about 0.5 micron, and most preferably not greater than about 0.4 micron, with a polydispersity that is preferably not greater than about 2, more preferably not greater than about 1.5, and most preferably not greater than about 1.3.

It has been surprisingly discovered that the volume average particle size and polydispersity of a final polyurethane/urea/thiourea latex prepared from an HIPR emulsion of a polyurethane/urea/thiourea prepolymer by the process of the present invention is generally less than the particle size and polydispersity of a polyurethane/urea/thiourea latex not prepared from an HIPR emulsion of a polyurethane/urea/thiourea prepolymer, for a given surfactant, and at a given concentration of the surfactant.

It is further surprising that a polyurethane latex with high solids content that is at least 45 percent by weight, preferably at least 50 percent by weight, more preferably at least 55 percent by weight, based on the weight of the latex, can be prepared by the process of the present invention. This high solids latex can be prepared without resorting to costly removal of water from a more dilute latex.

The polyurethane/urea/thiourea latexes of the present invention are useful for applications for latexes with controlled particle size and narrow size distributions are especially important. Such applications include films, floor coatings, and adhesives, especially for carpet-backing applications.

The following examples are for illustrative purposes only and are not intended to limit the scope of this invention. All percentages are in weight percent unless otherwise stated.

EXAMPLE 1

A urethane/urea prepolymer was prepared by reacting 70 percent by weight of a poly(propylene oxide) polyol VORANOL™ 2120 polyol (a trademark of The Dow Chemical Company) with 30 percent by weight of ISONATE™ 50 MDI (a trademark of The Dow Chemical Company; a 50:50 mixture of 4,4'-diisocyanatodiphenylmethane and 2,4'-diisocyanatodiphenylmethane). The following processes were carried out at 10° C. The prepolymer was fed continuously at a rate of 31.4 g/minute through a ½-inch (1.25 cm) stainless-steel tube fitted to one arm of a T. A 20-percent aqueous solution of a sodium dodecylbenzene sulfonate (RHODACAL™ DS-10, a trademark of Rhone Poûlenc) was fed continuously at a rate of 4.7 g/minute through a ⅛-inch (0.31 cm) stainless-steel tubing fitted to the other arm of the T. The two streams were combined and passed through a static mixer to form a non-emulsified blend. The blend was then fed into a ½-inch (1.25 cm) stainless-steel tube fitted to one arm of a T attached to the input of a 70-mL centrifugal pump. Concurrently, water was pumped through a ⅛-inch (0.31 cm) tetrafluoroethylene tubing fitted to the other arm of the T, at the rate of 3.0 g/minute. The two streams were merged and mixed together under shear in the centrifugal pump operating at 650 rpm to form an HIPR emulsion.

The HIPR emulsion was diluted in a second centrifugal pump by feeding the emulsion into a ½-inch (125 cm) stainless-steel tube fitted to one arm of a T attached to a centrifugal pump. Concurrently, water was pumped at a rate of 10 g/minute through ¼-inch (0.63 cm) tetrafluoroethylene tubing fitted to the other arm of the T. The two streams were mixed with the centrifugal pump operating at 900 rpm.

Chain extension was accomplished in a third centrifugal pump by feeding the diluted emulsion into a ½-inch (1.25 cm) stainless-steel tube fitted to an arm of a T that was attached to the input of a centrifugal pump. Concurrently, a 4.2 percent aqueous solution of piperazine was pumped at a constant rate of 22.0 g/minute through a ¼-inch (0.63 cm) tetrafluoroethylene tube fitted to the other arm of the T. The two streams were mixed in the centrifugal pump operating at 650 rpm. The product was collected and allowed to stand overnight to allow water to react with the remaining isocyanate groups. The resulting stable poly(urethane/urea) latex was found to have a solids content of 47.1 percent by weight, a volume average particle size of 0.342 micron, and a polydispersity of 1.2, as measured by a Coulter LS 230 particle size analyzer.

EXAMPLE 2

The prepolymer was prepared by combining VORANOL™ 5287 polyol (63.35 percent by weight, a trademark of The Dow Chemical Company), ISONATE™ 50 MDI (33.3 percent by weight), diethylene glycol (1.35 percent by weight), and polyethylene oxide monol having a molecular weight of 950. The following processes were conducted at ambient temperature (19° C.).

The prepolymer was fed continuously at rate of 32.1 g/minute through a first arm fitted to a first T. DeSULF™ DBS-60T surfactant (a 60 percent aqueous solution of triethanolamine dodecylbenzene sulfonate, a trademark of DeForest Enterprises, Inc.) was fed at a rate of 1.61 g/minute through a first arm of a second T, and merged with a water stream flowing at a rate of 5.5 g/minute through the second arm of the second T. The prepolymer stream and the water/surfactant stream were merged at the first T and passed through a static mixer and then fed to the input port of a IKA-SD 41 SUPER-DISPAX™ dispersing instrument (a trademark of IKA-WORKS, Inc.), which was a rotor/stator device that was operated at 1200 rpm.

The ratios of feeds into the dispersing instrument were 81.9 percent prepolymer, 4.1 percent surfactant solution, and 14.0 percent water. The HIPR emulsion formed in the dispersing instrument had a volume average particle size of 0.265 micron and a polydispersity of 3.1, as measured by a Coulter LS130 particle size analyzer.

Chain extension was accomplished in a LIGHTNIN™ model 0.025 LB in-line blender (a trademark of GREEY/LIGHTNIN). The HIPR emulsion from the dispersing instrument was fed into a first arm attached to a third T and merged with an aqueous stream fed through a second arm of the third T at the rate of 5.1 g/minute. The output of the combined streams was fed into one arm of a fourth T, which was attached to the input of the in-line blender. Concurrently, a 10 percent aqueous piperazine solution was pumped at a constant rate of 18.0 g/minute (0.75 equivalents, based on the isocyanate groups of the prepolymer) through the other arm of the fourth T. The two streams were mixed in the in-line blender operating at 1500 rpm. The product was collected and allowed to stand overnight to allow water to react with the remaining, isocyanate groups. The resulting stable poly(urethane/urea) latex was found to have a solids content of 56.0 percent by weight, a volume average particle size of 0.256 micron, and a polydispersity of 3.5, as measured by a Coulter LS 230 particle size analyzer.

EXAMPLE 3

The same general procedure used to prepare the latex from Example 2 was repeated. In this example, the surfactant was DeSULF™ LTS-40 surfactant (a 40 percent aqueous solution of triethanolamine lauryl sulfate, a trademark of Deforest Enterprises, Inc.) and the flow rates were prepolymer, 32.0 g/minute; surfactant, 2.4 g/minute; and water, 3.5 g/minute. The ratios of the components that were fed into the disperser were prepolymer, 84.4 percent; surfactant solution, 6.3 percent; and water, 9.2 percent. The HIPR emulsion had a volume in average particle size of 0.182 micron and a polydispersity of 1.6, as measured by a Coulter LS130 particle size analyzer.

The aqueous stream used to dilute the HIPR emulsion was flowed at a rate of 4.6 g/minute, and the piperazine solution was pumped at a rate of 17.9 g/minute. The final poly (urethane/urea) latex was found to have a solids content of 57.0 percent by weight, a or volume average particle size of 0.188 micron, and a polydispersity of 1.9.

What is claimed is:

1. A process for preparing a polyurethane/urea/thiourea latex comprising the steps of:
   a) forming by a continuous process a high internal phase ratio emulsion of a polyurethane/urea/thiourea prepolymer in the presence of water and an emulsifying and stabilizing amount of a surfactant; and
   b) contacting the high internal phase ratio emulsion with a chain-extending reagent under such conditions to form a polyurethane/urea/thiourea latex;
   wherein the prepolymer is prepared by contacting a high molecular weight organic compound having at least two active hydrogen atoms with sufficient polyisocyanate, and under such conditions to ensure that the prepolymer is terminated with at least two isocyanate groups.

2. The process of claim 1 wherein the polyurethane/urea/thiourea prepolymer is a polyurethane prepolymer.

3. The process of claim 2 wherein the polyurethane prepolymer is prepared by contacting a stoichiometric excess of a polyisocyanate with a polyalkylene glycol ether or a polyester polyol, wherein the polyalkylene glycol is a polyethylene ether glycol, a poly-1,2-propylene ether glycol, a polytetramethylene ether glycol, a poly-1,2-dimethylethylene ether glycol, a poly-1,2-butylene ether glycol, or a polydecamethylene ether glycol, or a combination thereof, and wherein the polyester polyol is a polyethylene terephthalate or a polybutylene adipate.

4. The process of claim 3 wherein the polyisocyanate is 4,4'-diisocyanatodiphenylmethane, 2,4'-diisocyanatodiphenylmethane, p-phenylene diisocyanate, 2,6 toluene diisocyanate, polyphenyl polymethylene polyisocyanate, 1,3-bis(isocyanatomethyl)-cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, 2,4'-diisocyanatodicyclohexylmethane, isophorone diisocyanate, or 2,4-toluene diisocyanate, or combinations thereof.

5. The process of claim 4 wherein the surfactant is a sulfate of an ethoxylated phenol, an alkali metal alkylbenzene sulfonate, an amine alkylbenzene sulfonate, an alkali metal lauryl sulfate, an amine lauryl sulfate, a polyoxyalkylene, an alkylphenol ethoxylate, or a quaternary ammionium surfactant, or a combination thereof.

6. The process of claim 1 wherein the chain-extending reagent contains water.

7. The process of claim 6 wherein the chain-extending reagent contains monoethanol amine, diethanol amine, hydrazine, aminoethylethanolamine, ethylene diamine, propylene-1,2-diamine, propylene-1,3-diamine, tetramethylenediamine, hexamethylenediamine, 4,4'-dimethylamino-3,3'-dimethyldiphenylmethane, 4,4'-diamino-diphenylmethane, 2,4-diaminotoluene, 2,6-diaminotoluene, or piperazine, or a combination thereof.

8. The process of claim 7 wherein the chain-extending reagent is an aqueous solution of piperazine.

9. The process of claim 1 wherein the high internal phase ratio emulsion is prepared by the steps of:
   a) continuously merging into a disperser and in the presence of an emulsifying and stabilizing amount of a surfactant, an aqueous stream having a flow rate $R_1$ and a polyurethane/urea/thiourea prepolymer stream having a flow rate $R_2$; and
   b) mixing the merged streams with a sufficient amount of shear to form a high internal phase ratio emulsion without phase inversion or stepwise distribution of an internal phase into an external phase;
   wherein $R_2:R_1$ is such that the polydispersity of the high internal phase ratio emulsion is not greater than about 3 or the volume average particle size is not greater than about 2 microns.

10. The process of claim 9 wherein the polyurethane/urea/thiourea prepolymer is prepared by a continuous process of merging a stream containing a polyisocyanate with a stream containing a polyalkylene glycol ether or a polyester polyol into a static or an active mixer, wherein the polyalkylene glycol or polyester polyol has a weight average molecular weight of not less than about 500 Daltons and not more than about 10,000 Daltons and is a polyethylene ether glycol, a poly-1,2-propylene ether glycol, a polytetramethylene ether glycol, a poly-1,2-dimethylethylene ether glycol, a poly-1,2-butylene ether glycol, a polydecamethylene ether glycol, a polyethylene terephthalate, a polybutylene adipate, or a combination thereof, and the polyisocyanate is 4,4'-diisocyanatodiphenylmethane, 2,4'-diisocyanatodiphenylmethane, p-phenylene diisocyanate, 2,6-toluene diisocyanate, 1,5-naphthalene diisocyanate, 3,3'-dimethyl-4,4'-biphenyl diisocyanate, or 2,4-toluene diisocyanate, or combinations thereof.

11. The process of claim 10 wherein the polyalkylene glycol ether is a polyethylene glycol ether having a weight average molecular weight of not greater than about 3000 Daltons and not less than about 750 Daltons, and the diisocyanate is 4,4'-diisocyanatodiphenylmethane or 2,4'-diisocyanatodiphenylmethane, or a combination thereof.

12. The process of claim 11 wherein the surfactant is a sodium dodecylbenzene sulfonate.

13. The process of claim 12 wherein the chain-extending, reagent is an aqueous solution of piperazine, which is contacted with a stoichiometric excess of the prepolymer so that the piperazine is substantially completely reacted.

14. The process of claim 1 wherein the high internal phase ratio emulsion of the prepolymer is formed in the substantial absence of a solvent.

15. The process of claim 5 wherein the surfactant is an amine alkylbenzene sulfonate, an amine lauryl sulfate, or an alkali metal dodecylbenze sulfonate.

16. The process of claim 15 wherein the surfactant is triethanolamine lauryl sulfate, triethanolamine dodecylbenzene sulfonate, or sodium dodecylbenzene sulfonate.

17. A process for preparing a polyurethane/urea/thiourea latex comprising the steps of:
   a) continuously merging into a disperser and in the presence of an emulsifying and stabilizing amount of a surfactant, an aqueous stream having, a flow rate $R_1$ and a polyurethane/urea/thiourea prepolymer stream having a flow rate $R_2$;
   b) mixing the merged streams with a sufficient amount of shear to form a high internal phase ratio emulsion without phase inversion or stepwise distribution of an internal phase into an external phase; and
   c) mixing the high internal phase ratio emulsion with water and a chain-extending reagent to form a polyurethane/urea/thiourea latex; wherein $R_2:R_1$ is such that the polydispersity of the high internal phase ratio emulsion is not greater than about 3 or the volume average particle size is not greater than about 2 microns;
   wherein the prepolymer is prepared by contacting a high molecular weight organic compound having at least two active hydrogen atoms with sufficient polyisocyanate, and under such conditions to ensure that the prepolymer is terminated with at least two isocyanate groups.

18. The process of claim 17 wherein the particles have a mean volume average particle size of not greater than about 0.5 micron, and wherein the latex is prepared in the absence of a solvent for a polyurethane/urea/thiourea prepolymer of the latex.

19. A process for preparing a high internal phase ratio emulsion without phase inversion comprising the steps of:
   a) continuously merging into a disperser and in the presence of an emulsifying and stabilizing amount of a surfactant, an aqueous stream having a flow rate $R_1$ and a polyurethane/urea/thiourea prepolymer stream having a flow rate $R_2$, wherein $R_2:R_1$ is such that the polydispersity of the high internal phase ratio emulsion is not greater than about 3 or the volume average particle size is not greater than about 2 microns; and
   b) mixing the merged streams with a sufficient amount of shear to form a high internal phase ratio emulsion;

wherein the prepolymer is prepared by contacting a high molecular weight organic compound with at least two active hydrogen atoms with sufficient polyisocyanate, and under such conditions to ensure that the prepolymer is terminated with at least two isocyanate groups.

20. The process of claim 19 wherein the polydispersity of the high internal phase ratio emulsion is not greater than about 1.5.

21. The process of claim 20 wherein the volume average particle size is not greater than about 0.35 micron.

* * * * *